(12) United States Patent
Seo et al.

(10) Patent No.: US 12,057,753 B2
(45) Date of Patent: Aug. 6, 2024

(54) BUSBAR UNIT FOR MOTOR

(71) Applicant: HYUNDAI MOBIS CO., LTD., Seoul (KR)

(72) Inventors: Yeong Woo Seo, Yongin-si (KR); Jae Min Lee, Yongin-si (KR); Jong Bin Park, Yongin-si (KR); Jung Kyu Yim, Yongin-si (KR)

(73) Assignee: Hyundai Mobis Co., Ltd., Seoul (KR)

( * ) Notice: Subject to any disclaimer, the term of this patent is extended or adjusted under 35 U.S.C. 154(b) by 353 days.

(21) Appl. No.: 17/361,722

(22) Filed: Jun. 29, 2021

(65) Prior Publication Data

US 2022/0014068 A1 Jan. 13, 2022

(30) Foreign Application Priority Data

Jul. 10, 2020 (KR) .......................... 10-2020-0085686

(51) Int. Cl.
*H02K 3/52* (2006.01)
*H02K 1/14* (2006.01)
*H02K 1/278* (2022.01)

(52) U.S. Cl.
CPC ............. *H02K 3/522* (2013.01); *H02K 1/148* (2013.01); *H02K 1/278* (2013.01); *H02K 2203/09* (2013.01)

(58) Field of Classification Search
CPC .................................................. H02K 2203/09
See application file for complete search history.

(56) References Cited

U.S. PATENT DOCUMENTS

2020/0028400 A1\* 1/2020 Seo .................. H02K 3/522
2021/0320548 A1\* 10/2021 Shimodaira .............. H02K 3/52

\* cited by examiner

*Primary Examiner* — Ramon M Barrera
(74) *Attorney, Agent, or Firm* — NSIP Law

(57) ABSTRACT

A busbar unit that is electrically connected a motor, the motor including a coil wound around a stator, the busbar unit including: a terminal disposed at an upper side of the stator and electrically connected to the coil in an outer region of the coil in a radial direction of the stator; and a holder configured to support the terminal.

8 Claims, 9 Drawing Sheets

BUSBAR UNIT FOR MOTOR

CROSS-REFERENCE TO RELATED APPLICATION

This application claims priority to and the benefit of Korean Patent Application No. 10-2020-0085686 filed in the Korean Intellectual Property Office on Jul. 10, 2020, the entire contents of which are incorporated herein by reference.

TECHNICAL FIELD

The present disclosure relates to a busbar unit for a motor, and more particularly, to a busbar unit for a motor that may have a simplified structure and improve a degree of design freedom and spatial utilization thereof.

BACKGROUND ART

A hybrid vehicle or an electric vehicle, which is called an environmentally-friendly vehicle, generates driving power using an electric motor (hereinafter, referred to as a 'drive motor') that obtains rotational force from electrical energy.

In general, the drive motor includes a stator coupled to a housing, and a rotor rotatably disposed in the stator with a predetermined air gap from the stator.

The stator includes stator cores formed by stacking electrical steel sheets, and stator coils wound around the stator cores.

A busbar is provided at an upper side of the stator, and the stator coils are connected to an external power source through the busbar.

The busbar is structured to include a plurality of terminals inside a ring-shaped holder, and the terminals are constituted as a combination of phase terminals connected to U-phase, V-phase, and W-phase power sources, and a neutral terminal that connects the phase terminals.

A terminal portion of the terminal is fused with the stator coil. After the terminal portion of the terminal is fused with the stator coil, an insulating material (e.g., epoxy) for insulation between the terminals is applied to cover the terminal portion of the terminal.

Meanwhile, the busbar is disposed at the upper side of the stator in an axial direction of the stator, and an overall height of the motor (a height of the motor in the axial direction of the stator) is increased as a thickness of the busbar (a thickness of the busbar in the axial direction of the stator) is increased. As a result, the thickness of the busbar needs to be minimized in order to miniaturize the motor.

In the related art, however, the terminal portion of the terminal is disposed at an upper side of the stator coil, and the stator coil is fused with the terminal portion at the upper side of the stator coil. Therefore, a space (height) for disposing the terminal portion of the terminal needs to be ensured at the upper side of the stator coil even though a thickness of the busbar is reduced maximally. For this reason, it is difficult to reduce an overall height of the motor.

Recently, various studies have been conducted to reduce a thickness of a busbar and miniaturize a motor, but the study results are still insufficient. Accordingly, there is a need to develop a technology for reducing a thickness of a busbar and miniaturizing a motor.

SUMMARY

This Summary is provided to introduce a selection of concepts in simplified form that are further described below in the Detailed Description. This Summary is not intended to identify key features or essential features of the claimed subject matter, nor is it intended to be used as an aid in determining the scope of the claimed subject matter.

In one general aspect, a busbar unit is configured to be electrically connected to a motor, the motor including a coil wound around a stator, the busbar unit including: a terminal disposed at an upper side of the stator and configured to be electrically connected to the coil in an outer region of the coil in a radial direction of the stator; and a holder configured to support the terminal.

The terminal may include: a body disposed at the upper side of the stator in the outer region of the coil; and a terminal portion protruding from an upper portion of the body and connected to the coil.

The terminal portion may include: a terminal body protruding from the upper portion of the body; a first terminal protrusion protruding from an upper portion of the terminal body; and a second terminal protrusion protruding from the upper portion of the terminal body and spaced apart from the first terminal protrusion. The first terminal protrusion and the second terminal protrusion may define a terminal groove that accommodates the coil.

The terminal groove may include: an entry portion having a first width; and a restriction portion extending from a lower portion of the entry portion and having a second width smaller than the first width. The coil may be disposed in the entry portion and restricted by the restriction portion.

The holder may surround the body, and the terminal portion may be exposed from an upper portion of the holder.

The busbar unit may include a catching portion configured to restrict a movement of the terminal portion relative to the holder.

The catching portion may include: a catching groove disposed in the holder; and a catching protrusion protruding from the terminal body and accommodated in the catching groove.

The catching groove may include a pair of catching grooves symmetric with respect to the terminal body, and the catching protrusion may include a pair of catching protrusions symmetric with respect to the terminal body.

The busbar unit may include a support portion disposed on the holder and configured to support the coil.

The support portion may be disposed on an inner surface of the holder to correspond to the terminal portion.

The support portion may include: a first support protrusion disposed on the holder; and a second support protrusion disposed on the holder and spaced apart from the first support protrusion. The first support protrusion and the second support protrusion may define a support groove that supports the coil.

At least one of the first support protrusion and the second support protrusion may include: a first protrusion portion disposed on an inner circumferential surface of the holder in an axial direction of the stator; and a second protrusion portion connected to the first protrusion portion and disposed on an upper surface of the holder in the radial direction of the stator.

The stator may include: a plurality of split cores defining a ring shape; and a support ring disposed to surround outer circumferential surfaces of the plurality of split cores.

Other features and aspects will be apparent from the following detailed description, the drawings, and the claims.

DETAILED DESCRIPTION

Figure 1:
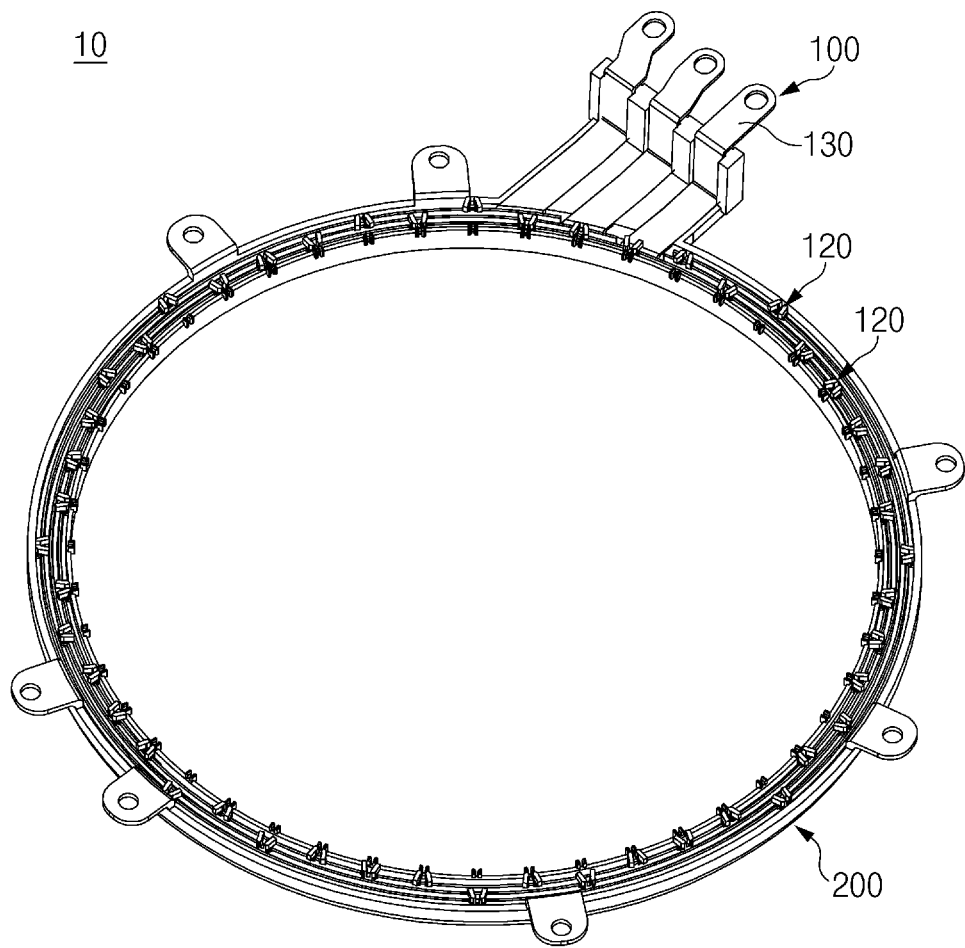
FIG. 1 is a perspective view for explaining a busbar unit for a motor according to an embodiment of the present disclosure.

Hereinafter, embodiments of the present disclosure will be described in detail with reference to the accompanying drawings.

However, the technical spirit of the present disclosure is not limited to some embodiments described herein but may be implemented in various different forms. One or more of the constituent elements in the embodiments may be selectively combined and substituted for use within the scope of the technical spirit of the present disclosure.

In addition, unless otherwise specifically and explicitly defined and stated, the terms (including technical and scientific terms) used in the embodiments of the present disclosure may be construed as the meaning which may be commonly understood by the person with ordinary skill in the art to which the present disclosure pertains. The meanings of the commonly used terms such as the terms defined in dictionaries may be interpreted in consideration of the contextual meanings of the related technology.

In addition, the terms used in the embodiments of the present disclosure are for explaining the embodiments, not for limiting the present disclosure.

In the present specification, unless particularly stated otherwise, a singular form may also include a plural form. The expression "at least one (or one or more) of A, B, and C" may include one or more of all combinations that can be made by combining A, B, and C.

In addition, the terms such as first, second, A, B, (a), and (b) may be used to describe constituent elements of the embodiments of the present disclosure.

These terms are used only for the purpose of discriminating one constituent element from another constituent element, and the nature, the sequences, or the orders of the constituent elements are not limited by the terms.

Further, when one constituent element is described as being 'connected', 'coupled', or 'attached' to another constituent element, one constituent element may be connected, coupled, or attached directly to another constituent element or connected, coupled, or attached to another constituent element through still another constituent element interposed therebetween.

In addition, the expression "one constituent element is provided or disposed above (on) or below (under) another constituent element" includes not only a case in which the two constituent elements are in direct contact with each other, but also a case in which one or more other constituent elements are provided or disposed between the two constituent elements. The expression "above (on) or below (under)" may mean a downward direction as well as an upward direction based on one constituent element.

Referring to FIGS. 1 to 9, a busbar unit 10 for a motor according to an embodiment of the present disclosure is electrically connected to the motor including a stator 20 around which coils 60 are wound, the busbar unit 10 includes: terminals 100 provided at an upper side of the stator 20 and electrically connected to the coils 60 in an outer region of the coils 60 in a radial direction of the stator 20; and a holder 200 configured to support the terminals 100.

For reference, the busbar unit 10 for a motor according to the embodiment of the present disclosure may be mounted in various types of motors in accordance with required conditions and design specifications, and the present disclosure is not restricted or limited by the type and structure of the motors.

As an example, a motor, to which the busbar unit 10 according to the exemplary embodiment of the present disclosure is applied, may be used as a drive motor for an environmentally-friendly vehicle, such as a hybrid vehicle and/or an electric vehicle, which obtains driving power from electrical energy.

For example, the drive motor is an inner-rotor-type synchronous motor and includes the stator 20 installed in a motor housing (not illustrated), and a rotor (not illustrated) rotatably installed in the stator 20 with a predetermined air gap from the stator 20. The busbar unit 10 according to the exemplary embodiment of the present disclosure may be connected to the stator 20.

The stator 20 may be accommodated in the housing (not illustrated), and the coil 60 may be wound around the stator 20 so as to induce an electrical interaction between the stator and the rotor.

For example, the stator 20 includes a plurality of split cores 30 provided to cooperatively define a ring shape, and a support ring 40 provided to surround outer circumferential surfaces of the plurality of split cores 30.

The split core 30 may be variously changed in number and structure in accordance with required conditions and design specifications, and the present disclosure is not restricted or limited by the number of split cores 30 and the structure of the split core 30.

More specifically, the split core 30 may be provided by stacking a plurality of electrical steel sheets in an axial direction of the rotor.

A bobbin 50 (made of plastic, for example) is provided around each of the split cores, and the coil 60 is wound around the bobbin 50.

According to another exemplary embodiment of the present disclosure, the stator may include a single core.

The rotor is provided to be rotated by the electrical interaction between the stator 20 and the rotor.

As an example, the rotor may include a rotor core (not illustrated) and magnets (not illustrated). The rotor core may be structured by stacking a plurality of circular plates each provided in the form of a thin steel sheet or structured in the form of a bin.

A hole (not illustrated), to which a shaft is coupled, may be provided at a center of the rotor. Protrusions (not illustrated), which guide the magnets, may protrude from an outer circumferential surface of the rotor core. The magnets may be attached to the outer circumferential surface of the rotor core so as to be spaced apart from one another at predetermined intervals in a circumferential direction of the rotor core.

In addition, the rotor may include a can member (not illustrated) disposed to surround the magnets and configured to prevent the separation of the magnets.

The busbar unit 10 includes the terminals 100 and the holder 200, and the busbar unit 10 is disposed at the upper side of the stator 20.

The terminal 100 is provided to electrically connect the coil 60 of the stator 20 to an external power source.

Figure 2:
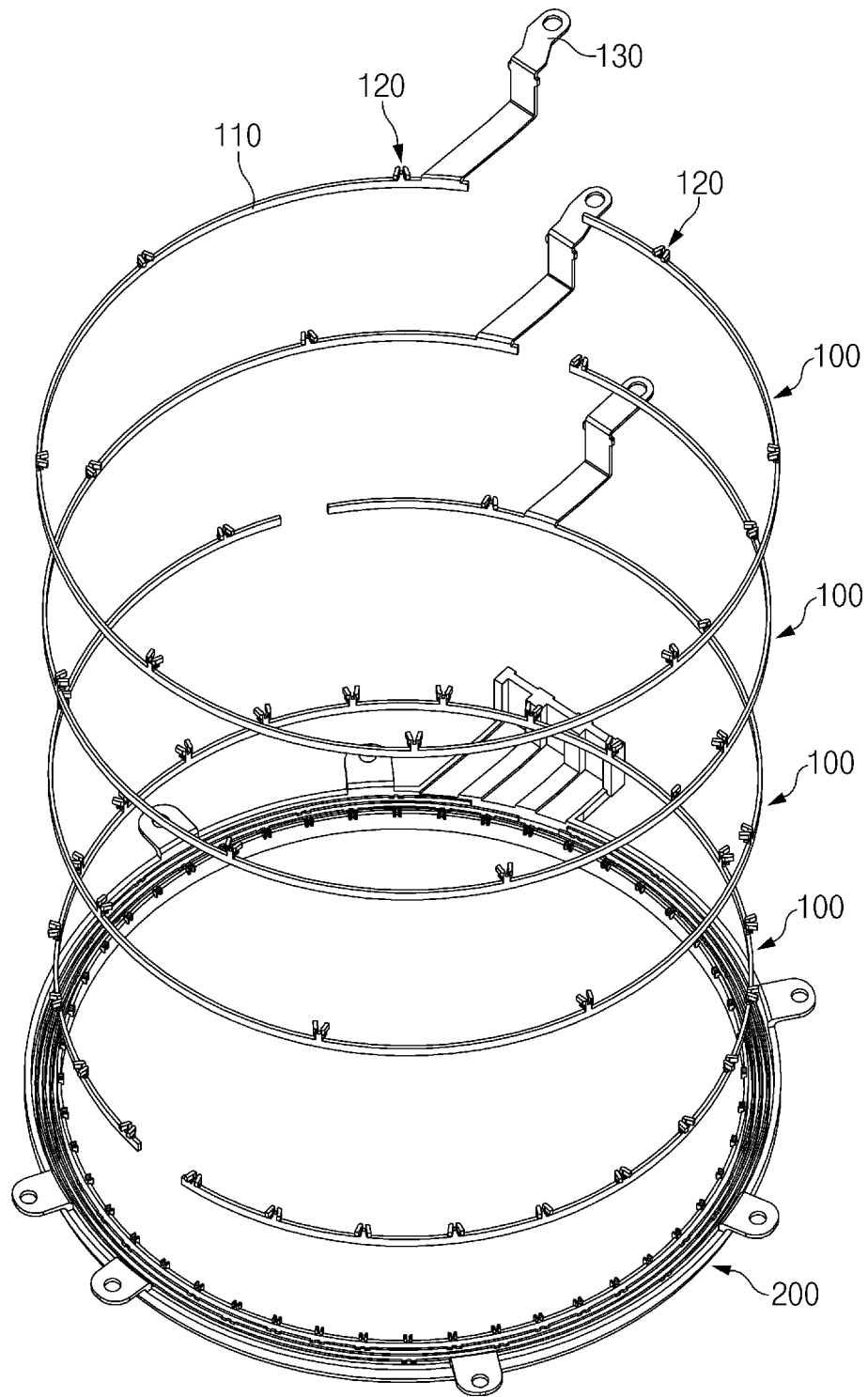
FIG. 2 is an exploded perspective view for explaining the busbar unit for a motor according to the exemplary embodiment of the present disclosure.
Figure 3:
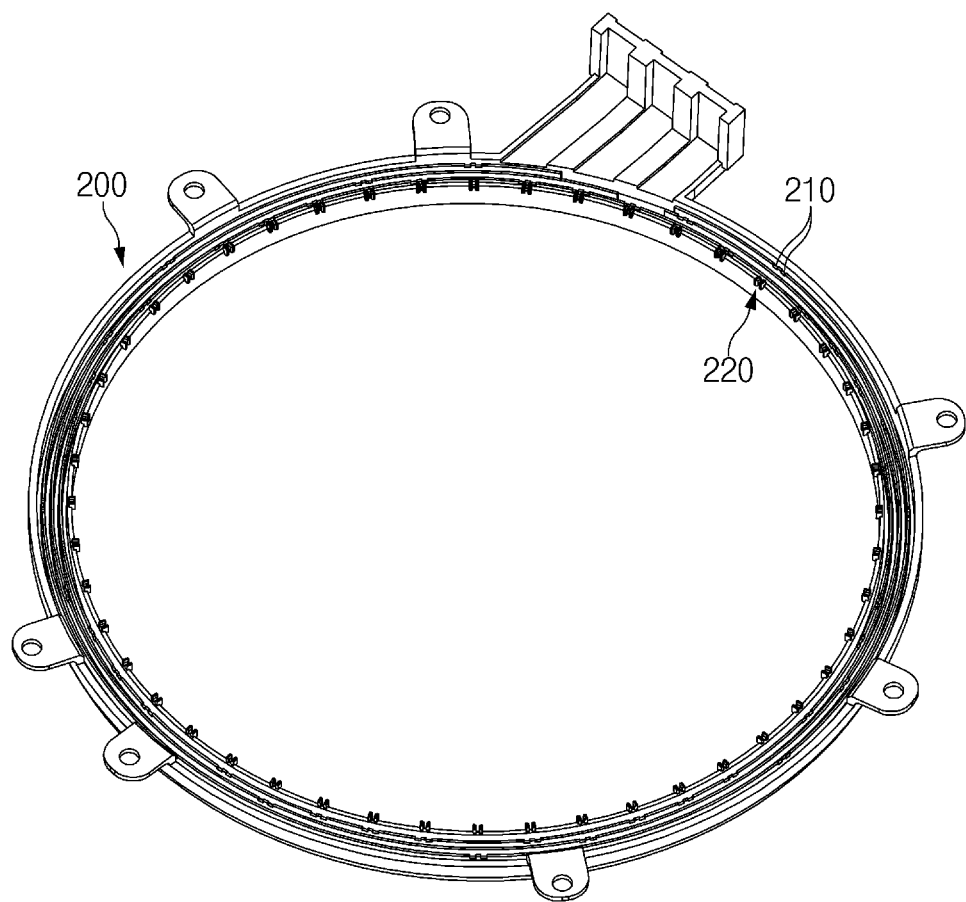
FIG. 3 is a view for explaining a holder of the busbar unit for a motor according to the embodiment of the present disclosure.
Figure 4:
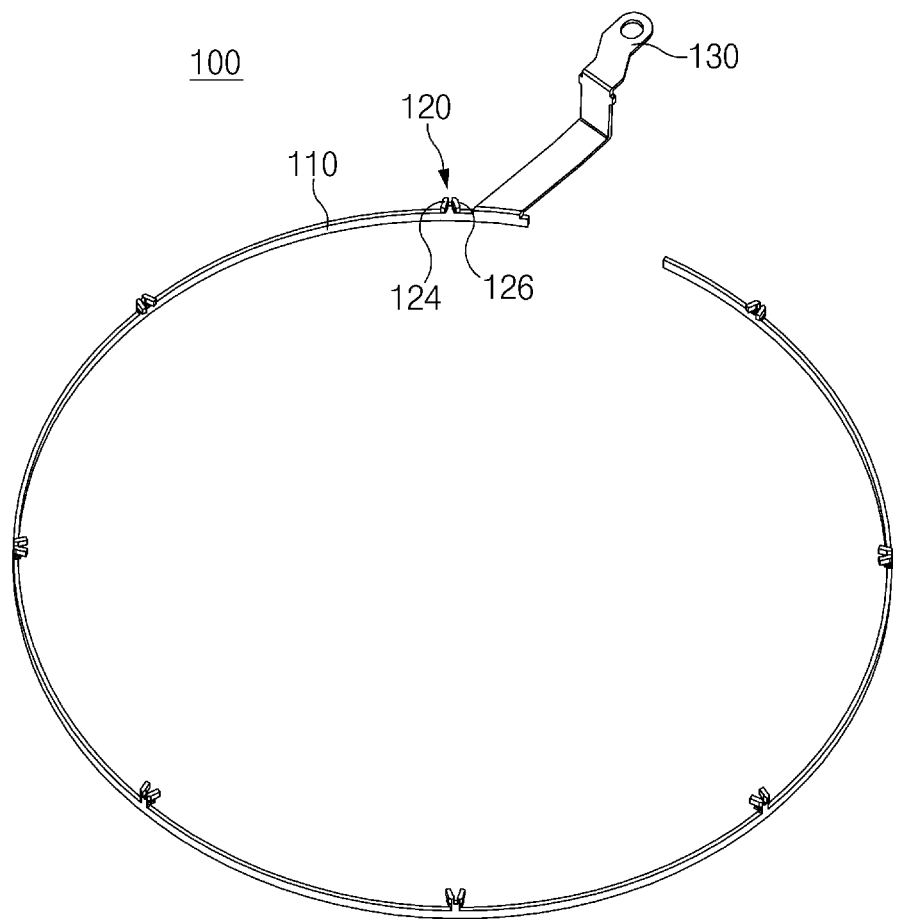
FIG. 4 is a view for explaining a terminal of the busbar unit for a motor according to the embodiment of the present disclosure.
Figure 5:
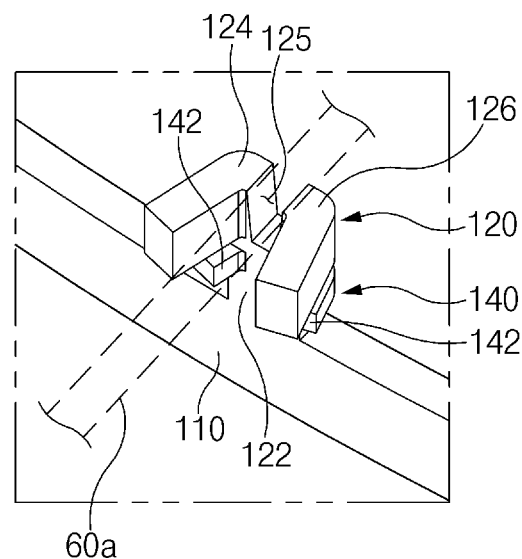
FIGS. 5 and 6 are views for explaining a terminal portion of the busbar unit for a motor according to the embodiment of the present disclosure.
Figure 6:
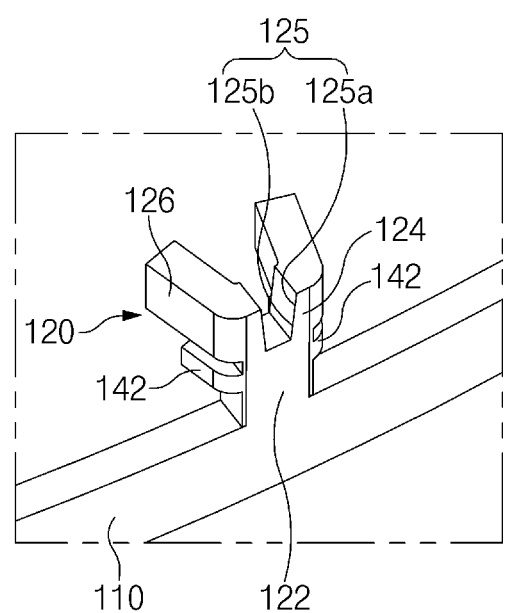

Referring to FIGS. 2 and 4, the terminal 100 may be at least one of phase terminals (a U-phase terminal, a V-phase terminal, and a W-phase terminal) connected to a U-phase power source, a V-phase power source, and a W-phase power source and a neutral terminal for electrically connecting the phase terminals.

More specifically, the terminal 100 includes a body 110 accommodated in the holder 200, and terminal portions 120 protruding from an upper portion of the body 110 and connected to the coils 60.

The structure and shape of the body 110 may be variously changed in accordance with required conditions and design specifications. For example, the body 110 may have a single-layered structure and may be provided as a band member in the form of an arc (or a ring) having a predetermined curvature.

According to another embodiment of the present disclosure, the body may have a double-layered structure (multilayer structure) having a bent portion.

The terminal portion 120 protrudes from the upper portion of the body 110, and the coil 60 of the stator 20 is fused with (connected to) the terminal portion 120.

The terminal portion 120 may have various structures with which an end 60*a* of the coil 60 may be fused, and the present disclosure is not restricted or limited by the structure and shape of the terminal portion 120.

For example, the terminal portion 120 includes a terminal body 122 protruding from the upper portion of the body 110, a first terminal protrusion 124 protruding from an upper portion of the terminal body 122, and a second terminal protrusion 126 protruding from the upper portion of the terminal body 122 so as to be spaced apart from the first terminal protrusion 124. The first terminal protrusion 124 and the second terminal protrusion 126 cooperatively define a terminal groove 125 that accommodates the coil 60.

For example, the first terminal protrusion 124 and the second terminal protrusion 126 may be provided to cooperatively define an approximately "V" shape. The terminal groove 125 provided between the first terminal protrusion 124 and the second terminal protrusion 126 accommodates the end 60*a* of the coil 60, wound around the stator 20, in the outer region of the coil 60 in the radial direction of the stator 20 (the upper region of the body 110).

The end 60*a* of the coil 60 may be integrally fixed to the first terminal protrusion 124 and the second terminal protrusion 126 by being welded to the first terminal protrusion 124 and the second terminal protrusion 126 in the state in which the end 60*a* of the coil 60 is fitted into the terminal groove 125.

In particular, the terminal groove 125 includes an entry portion 125*a* having a first width, and a restriction portion 125*b* having a second width smaller than the first width and extending from a lower portion of the entry portion 125*a*. The coil 60 enters through the entry portion 125*a* and is restricted by the restriction portion 125*b*.

In more particular, the restriction portion 125*b* has such a width (second width) that may restrict the movement of the end 60*a* of the coil 60.

Since the terminal groove 125 includes the entry portion 125*a* and the restriction portion 125*b* having different widths as described above, it is possible to obtain an advantageous effect of ensuring a smooth entry of the coil 60 into the terminal groove 125 from the outside of the terminal groove 125 and stably maintaining an arrangement state of the coil 60 disposed in the terminal groove 125.

In particular, an operator or a separate jig may fix the end 60*a* of the coil 60 by fitting the end 60*a* of the coil 60 into the terminal groove 125 and thus need not support and fix the coil 60 in the state in which the coil 60 is disposed in the terminal groove 125 (e.g., at the time of welding). Therefore, it is possible to obtain an advantageous effect of simplifying the manufacturing process and reducing the manufacturing time.

In the embodiment of the present disclosure described and illustrated above, the example in which the terminal portion 120 has a blade structure including the first terminal protrusion 124 and the second terminal protrusion 126 has been described. However, according to another embodiment of the present disclosure, the terminal portion may have a bent shape such as a hook or other structures.

In addition, the terminal 100 may include a power terminal portion 130 protruding from an outer circumferential surface of the holder 200.

The power terminal portion 130 extends from an outer surface of the body 110 and protrudes from the outer circumferential surface of the holder 200. The power terminal portion 130 may be electrically connected to each of external power cables corresponding to the respective phases (the U-phase, the V-phase, and the W-phase).

The holder 200 is provided to support the arrangement state of the terminals 100 and electrically insulate the terminals 100.

The material and shape of the holder 200 may be variously changed in accordance with required conditions and design specifications, and the present disclosure is not restricted or limited by the material and shape of the holder 200.

For example, the holder 200 may have a hollow ring shape and be provided as a molded product (made of an insulating material, for example) provided by injection molding.

According to the exemplary embodiment of the present disclosure, the holder 200 is provided to surround the body 110, and the terminal portion 120 is exposed from an upper portion of the holder 200.

The busbar unit 10 according to the exemplary embodiment of the present disclosure may include catching portions 140 each configured to restrict the movement of the terminal portion 120 relative to the holder 200.

Since the catching portion 140 may be provided to restrict the movement of the terminal portion 120 relative to the holder 200 as described above, it is possible to obtain an advantageous effect of inhibiting the terminal portion 120 from being inadvertently distorted or deformed in position during the process of manufacturing the holder 200 by injection molding.

The catching portion 140 may have various structures capable of restricting the movement of the terminal portion 120 relative to the holder 200, and the present disclosure is not restricted or limited by the structure of the catching portion 140.

For example, referring to FIGS. 5 to 8, the catching portion 140 may include catching grooves 210 formed in the holder 200, and catching protrusions 142 protruding from the terminal body 122 and accommodated in the catching grooves 210.

In particular, a pair of catching grooves 210 is provided to be symmetric with respect to the terminal body 122, and a pair of catching protrusions 142 is provided to be symmetric with respect to the terminal body 122.

Since the catching protrusions 142 are provided at two opposite sides of the terminal body 122, respectively, and the catching protrusions 142 are restricted by the catching grooves 210 provided in the holder 200, respectively, as described above, it is possible to obtain an advantageous effect of more assuredly inhibiting the leftward and rightward movements of the terminal portion 120.

Figure 7:
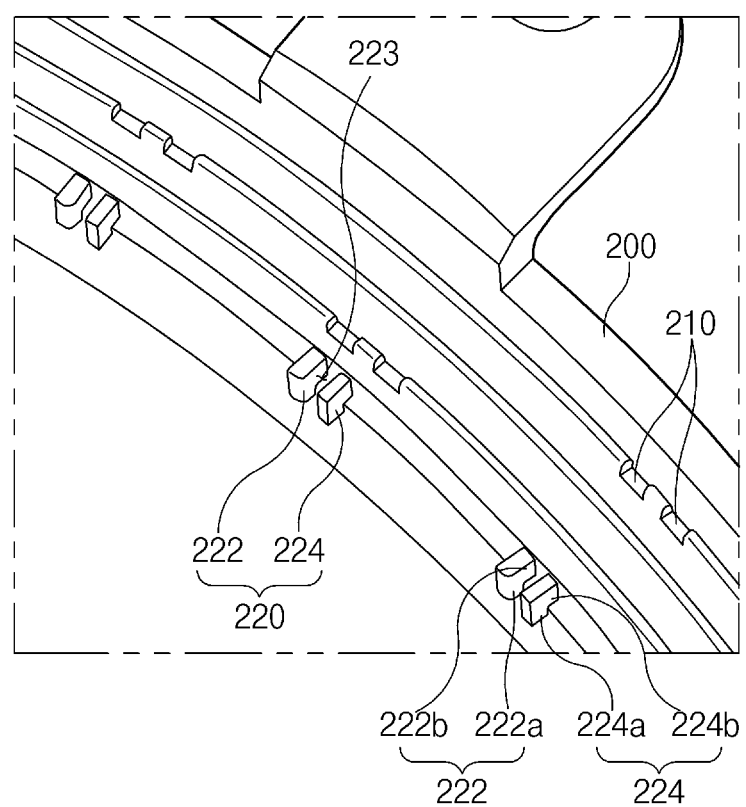
FIGS. 7 and 8 are views for explaining a catching portion and a support portion of the busbar unit for a motor according to the embodiment of the present disclosure.
Figure 8:
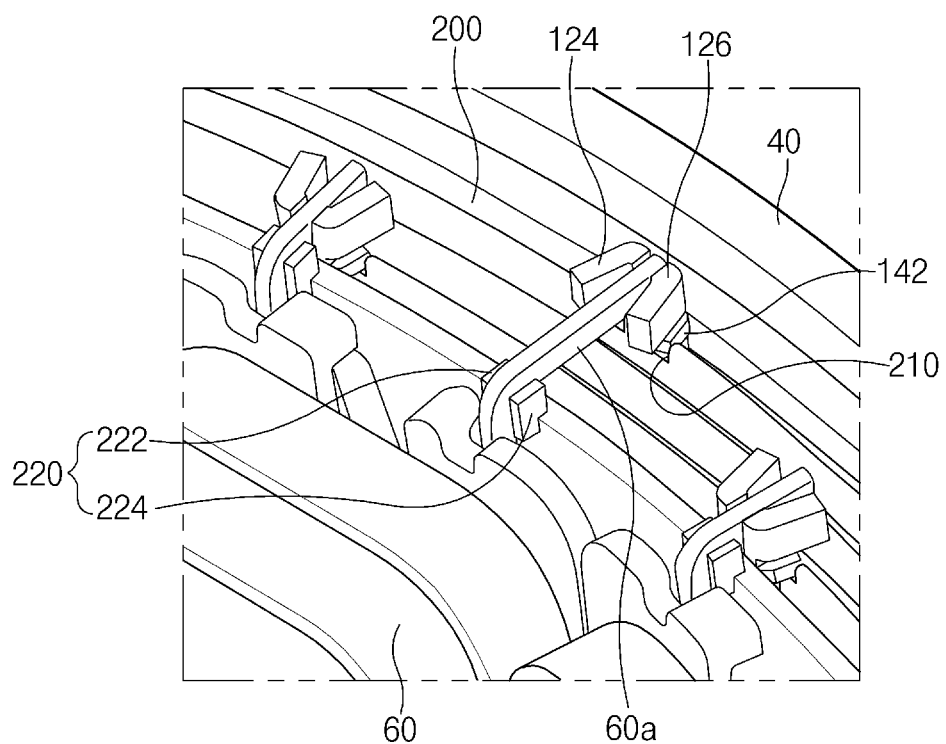

Referring to FIGS. 7 and 8, the busbar unit 10 according to the exemplary embodiment of the present disclosure may include support portions 220 provided on the holder 200 and configured to support the coils 60.

The support portion 220 is provided to support the coil 60 in an accurate direction and at a precise angle when forming the end 60a of the coil 60 wound around the stator 20 toward the terminal portion 120 (forming the end 60a of the coil 60 in the radial direction of the stator 20).

In particular, the support portion 220 is provided on an inner surface of the holder 200 so as to correspond to the terminal portion 120.

In this case, the configuration in which the support portion 220 is provided to correspond to the terminal portion 120 means that the support portion 220 and the terminal portion 120 are disposed on approximately the same line in the radial direction of the stator 20.

Since the support portion 220 is provided to correspond to the terminal portion 120 as described above, it is possible to obtain an advantageous effect of more accurately guiding and supporting the end 60a of the coil 60 to the terminal portion 120.

The support portion 220 may have various structures capable of guiding and supporting the formation of the coil 60, and the present disclosure is not restricted or limited by the structure of the support portion 220.

For example, the support portion 220 includes a first support protrusion 222 provided on the holder 200, and a second support protrusion 224 provided on the holder 200 and spaced apart from the first support protrusion 222. The first support protrusion 222 and the second support protrusion 224 cooperatively define a support groove 223 for supporting the coil 60.

The support groove 223 may accommodate the coil 60 to guide and support the coil 60 toward the terminal portion 120.

In particular, the first and second support protrusions 222 and 224 each include a first protrusion portion 222a or 224a provided on an inner circumferential surface of the holder 200 in an axial direction of the stator 20, and a second protrusion portion 222b or 224b connected to the first protrusion portion 222a or 224a and provided on an upper surface of the holder 200 in the radial direction of the stator 20. The first and second support protrusions 222 and 224 are each provided at a boundary portion between the inner circumferential surface and the upper surface of the holder 200 and have an approximately "L" cross-sectional shape.

Since the first and second support protrusions 222 and 224 each include the first protrusion portion 222a or 224a and the second protrusion portion 222b or 224b as described above, the coil 60 may be supported in both the axial direction of the stator 20 and the radial direction of the stator 20. Therefore, it is possible to obtain an advantageous effect of more accurately guiding and supporting the formation of the coil 60 from the axial direction of the stator 20 to the radial direction of the stator 20.

As described above, in the embodiment of the present disclosure, since the terminal 100 and the coil 60 are connected in the outer region of the coil 60 in the radial direction of the stator 20, it is not necessary to provide a space at the upper side of the coil 60 so as to connect (fuse) the terminal 100 and the coil 60. Therefore, it is possible to minimize a thickness of the busbar unit 10.

Therefore, it is possible to obtain an advantageous effect of improving spatial utilization in a region above the stator 20, improving a degree of design freedom, minimizing an increase in size of the motor caused by the busbar mounted to implement a control circuit for the motor, and contributing to the miniaturization of the motor.

Figure 9:
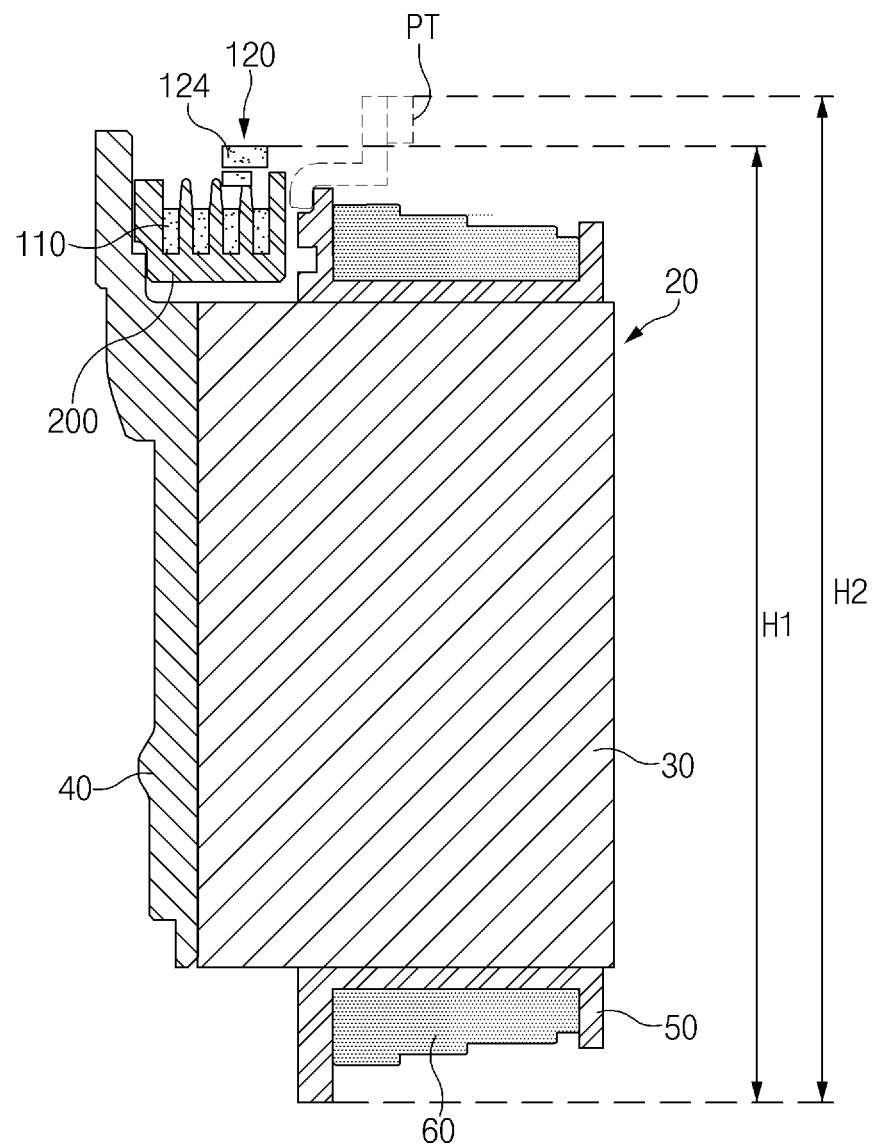
FIG. 9 is a view for explaining an example in which the busbar unit for a motor according to the embodiment of the present disclosure is mounted.

Referring to FIG. 9, in the related art, a terminal portion PT of the terminal is disposed at an upper side of the coil 60 of the stator 20, and the coil 60 of the stator 20 is fused with the terminal portion PT at the upper side of the coil 60 of the stator 20. Therefore, a space (height) for disposing the terminal portion 120 of the terminal 100 needs to be ensured at the upper side of the coil 60 of the stator 20 even though a thickness of the busbar is reduced maximally. For this reason, it is difficult to reduce an overall height H2 of the motor.

However, according to the embodiment of the present disclosure, since the terminal portion 120 and the coil 60 are connected in the outer region of the coil 60 in the radial direction of the stator 20, it is possible to eliminate a space for connecting (fusing) the terminal 100 and the coil 60 at the upper side of the coil 60. Therefore, it is possible to obtain an advantageous effect of further reducing the overall height of the motor to a height H1 smaller than the height H2 of the structure in the related art in which the coil 60 is fused at the upper side of the stator coil 60.

As described above, according to the exemplary embodiment of the present disclosure, it is possible to obtain an advantageous effect of simplifying a structure and improving a degree of design freedom and spatial utilization.

In particular, according to the exemplary embodiment of the present disclosure, it is possible to obtain an advantageous effect of minimizing a thickness of the busbar unit and contributing to the miniaturization of the motor.

In addition, according to the embodiment of the present disclosure, it is possible to obtain an advantageous effect of inhibiting the deformation of the terminal portion and improving stability and reliability.

In addition, according to the embodiment of the present disclosure, it is possible to obtain an advantageous effect of simplifying a manufacturing process and reducing manufacturing time.

While the embodiments have been described above, the embodiments are just illustrative and not intended to limit the present disclosure. It can be appreciated by those skilled in the art that various modifications and applications, which are not described above, may be made to the present embodiment without departing from the intrinsic features of the present embodiment. For example, the respective constituent elements specifically described in the embodiments may be modified and then carried out. Further, it should be interpreted that the differences related to the modifications and applications are included in the scope of the present disclosure defined by the appended claims.

What is claimed is:

1. A busbar electrically connected to a motor, the motor comprising a coil wound around a stator, the busbar comprising:
   a terminal disposed at an upper side of the stator and electrically connected to the coil in an outer region of the coil in a radial direction of the stator, the terminal comprising a terminal portion extending in a radial direction of the stator and connected to the coil, a body disposed at the upper side of the stator in the outer region of the coil, wherein the terminal portion protrudes from an upper portion of the body;
   a holder supporting the terminal,
   wherein the terminal portion comprises:
      a terminal body protruding from the upper portion of the body, wherein a first terminal protrusion protrudes from an upper portion of the terminal body, a second terminal protrusion protrudes from the upper portion of the terminal body and is spaced apart from the first terminal protrusion, and
      and the first terminal protrusion and the second terminal protrusion define a terminal groove that accommodates the coil,
   wherein the holder surrounds the body, and the terminal portion is exposed from an upper portion of the holder; and
   a catching portion restricting a movement of the terminal portion relative to the holder, the catching portion comprising a catching groove disposed in the holder and a catching protrusion protruding from the terminal body and accommodated in the catching groove.

2. The busbar of claim 1, wherein the terminal groove comprises:
   an entry portion having a first width; and
   a restriction portion extending from a lower portion of the entry portion and having a second width smaller than the first width,
   wherein the coil is disposed in the entry portion and is restricted by the restriction portion.

3. The busbar of claim 1, wherein the catching groove comprises a pair of catching grooves symmetric with respect to the terminal body, and the catching protrusion comprises a pair of catching protrusions symmetric with respect to the terminal body.

4. The busbar of claim 1, comprising:
   a support portion disposed on the holder and supporting the coil.

5. The busbar of claim 4, wherein the support portion is disposed on an inner surface of the holder to correspond to the terminal portion.

6. The busbar of claim 4, wherein the support portion comprises:
   a first support protrusion disposed on the holder; and
   a second support protrusion disposed on the holder and spaced apart from the first support protrusion,
   wherein the first support protrusion and the second support protrusion define a support groove that supports the coil.

7. The busbar of claim 6, wherein at least one of the first support protrusion and the second support protrusion comprises:
   a first protrusion portion disposed on an inner circumferential surface of the holder in an axial direction of the stator; and
   a second protrusion portion connected to the first protrusion portion and disposed on an upper surface of the holder in the radial direction of the stator.

8. The busbar of claim 1, wherein the stator comprises:
   a plurality of split cores defining a ring shape; and
   a support ring surrounding outer circumferential surfaces of the plurality of split cores.

* * * * *